Nov. 15, 1966  J. W. DAVIS  3,285,010
MASTER CYLINDER ASSEMBLIES
Filed Jan. 5, 1965  2 Sheets-Sheet 1
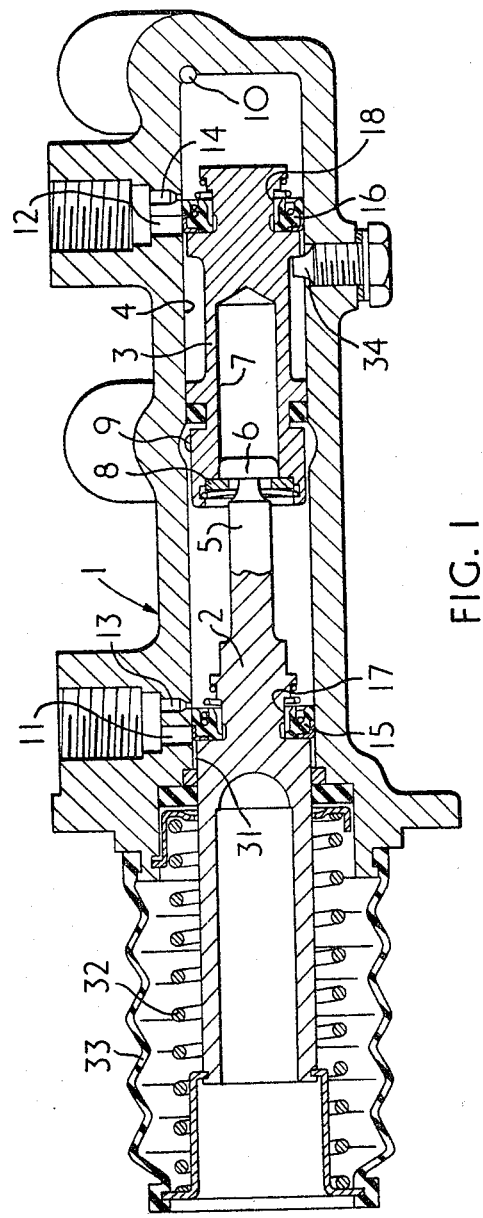
FIG. I Nov. 15, 1966    J. W. DAVIS    3,285,010
MASTER CYLINDER ASSEMBLIES
Filed Jan. 5, 1965    2 Sheets-Sheet 2

3,285,010
MASTER CYLINDER ASSEMBLIES
John Walter Davis, Birmingham, England, assignor to Dunlop Rubber Company Limited, London and Erdington, Birmingham, England, a corporation of Great Britain
Filed Jan. 5, 1965, Ser. No. 423,419
Claims priority, application Great Britain, Jan. 8, 1964, 809/64
13 Claims. (Cl. 60—54.6)

This invention relates to master cylinder assemblies for hydraulic systems, for example, vehicle brake operating systems.

In a vehicle hydraulic braking system operated by a master cylinder assembly, it is necessary to provide a reserve tank of hydraulic fluid to keep the system filled to compensate for brake lining wear which takes place and to replenish the system when small quantities of fluid are lost by leakage. The reserve tank is connected to the interior of the master cylinder through an inlet which is controlled to provide a restricted passage for fluid to pass from the tank to the cylinder during the return stroke of the piston, and to seal the passage during the forward stroke of the piston.

The object of the present invention is to provide means for controlling the communication between the reserve tank and the interior of the cylinder and hence the hydraulic braking system.

According to the invention a master cylinder assembly for a hydraulic system comprises a piston and cylinder, the cylinder having a fluid outlet on the forward side of the piston and an inlet for fluid on the other or rear side of the piston. The piston is provided with a resilient sealing ring for engagement with the cylinder wall and is axially slidably mounted between two axially spaced radially extending abutments on the piston, the sealing ring having at least one axially extending channel formed on its inner peripheral surface to provide on the return stroke of the piston a passage for hydraulic fluid between the inlet and the part of the interior of the cylinder forward of the piston, the ring being engageable with a rear abutment face on the piston during the forward stroke of the piston to seal the passage for hydraulic fluid.

The invention also provides a sealing ring and a piston and sealing ring assembly for use in a master cylinder assembly as defined in the preceding paragraph.

One embodiment of the invention will now be described by way of example, with reference to the accompanying drawings, in which:

FIGURE 1 is an axial cross-sectional view of a master cylinder assembly;

Figure 3:
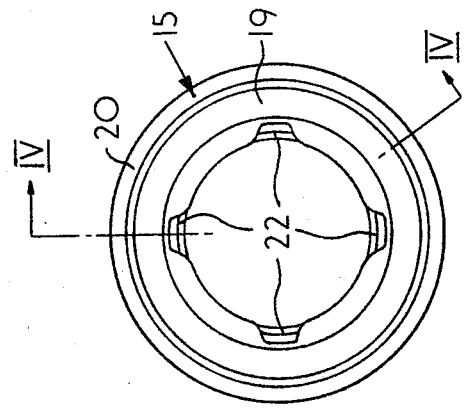
FIGURE 3 is an end view of a sealing ring.

A dual master cylinder assembly 1 comprises a pair of pistons 2 and 3 slidable in a cylinder 4 and linked together by a stem 5 having a head 6 slidable in a bore 7 of the piston 3 and engageable with an abutment 8 to ensure that on the return stroke of the pistons the pistons are both brought back to a predetermined position. Two pressure outlets 9 and 10 are provided, one for each piston, and are connected to independent braking systems on a vehicle.

Fluid inlets 11 and 12, which are connected to reserve tanks for the respective independent hydraulic systems are provided in the wall of the cylinder 4, the inlets being positioned adjacent to the fully returned positions of the associated pistons. Small vent holes 13 and 14 leading to the reserve tank are also provided adjacent to the fluid inlets to allow excess fluid to flow back to the reserve tanks after the pistons 2 and 3 have been fully retracted.

The pistons 2 and 3 are provided with resilient sealing rings 15 and 16 which are axially slidably mounted on reduced-diameter portions 17 and 18 of the pistons. The sealing rings and the associated portions of the two pistons are similar in construction, and only that associated with the piston 2 will therefore be described.

Figure 4:
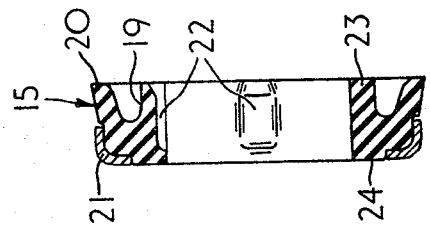
FIGURE 4 is an axial cross-sectional view of the sealing ring, taken on the line IV—IV of FIGURE 3.
Figure 2:
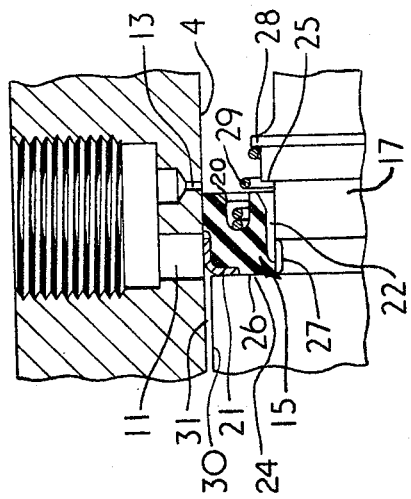
FIGURE 2 is an axial cross-sectional view showing part of the assembly of FIGURE 1, to a larger scale.

The sealing ring 15 (see FIGURES 3 and 4) is in the form of a solid rubber annulus having a recess 19 on its forward face, coaxial with the ring, and an axially forwardly extending lip 20 on the outer periphery of the ring for engagement with the wall of the cylinder. A metal backing ring 21 of L-shaped cross-section is fitted to the outer edge of the rear face of the ring 15 to provide support for the sealing ring against hydraulic pressure developed during a braking operation. The inner peripheral surface of the ring is provided with four channels 22, in equally spaced-apart angular positions around the ring, extending axially from the forward face 23 of the sealing ring and each terminating at a point forward of the rear face 24 of the ring. The channels 22 are flared radially outwardly at their forward ends.

The sealing ring 15 is slidably mounted on the reduced-diameter portion 17 of the piston 2, which is bounded by flat radially outwardly extending abutment faces 25 and 26. An annular recess 27 is provided in the reduced-diameter portion of the piston adjacent the rear abutment face 26. The forward abutment face 25 is smaller in diameter than the pitch circle on the sealing ring of the outer edges of the flared portions of the axially extending channels, to ensure communication between the channels and the interior of the cylinder forward of the piston when the sealing ring abuts the forward abutment. A radially outwardly extending ledge 28 is provided on the piston in front of the sealing ring to locate one end of a coil spring 29 which engages in the recess of the sealing ring at its other end to apply a light pressure tending to move the sealing ring towards the rear abutment face 26.

The diameter of the portion 30 of the piston behind the rear abutment face is such as to provide an annular space 31 communicating with the inlet 11, and fluid can flow from the space 31 between the rear abutment face and the sealing ring whenever the sealing ring is moved away from the rear abutment face. The distance between the rear and forward abutment faces is such that when the sealing ring is in contact with the forward abutment face 25 a restricted passage is provided to enable fluid to flow between the rear face of the sealing ring and the rear abutment face, through the annular recess 27 in the reduced-diameter portion of the piston, and along the channels 22 in the sealing ring into the interior of the cylinder forward of the piston.

The piston 2 is normally held back by a retraction spring 32 enclosed by a rubber boot 33, return movement of the pistons 2 and 3 being limited by a stop 34.

In operation the piston 2 is moved forwardly to pressurize the fluid in the cylinder, the sealing ring 15 being forced back against the rear abutment face 26 by the coil spring 29 to provide an initial seal and then being held against that face by the hydraulic pressure developed. On the return stroke of the piston, the sealing ring moves to the forward position in which a restricted passage for fluid is established between the interior of the cylinder and the reserve tank as described above.

The sealing ring described above has the advantage that it provides a restricted passage for the recuperation of hydraulic fluid which offers a substantially constant resistance to the flow of fluid which is relatively unaffected by the swelling of the sealing ring. This is an important advantage over sealing rings which fit loosely on a reduced-diameter portion of a piston and are not provided with axially extending channels, since in the latter instance swelling of the sealing ring would reduce the clearance between the ring and the piston. In the case of the sealing ring described above the sealing ring is a sliding fit on the piston, and relies on the channels, which are all of substantially fixed dimensions, to convey the recuperation fluid.

A further advantage of the sealing ring described above is that when the piston is moved forward and the sealing ring is not fully seated against the rear abutment face the flow of fluid through the channels tends to move the ring back into firm contact with the rear abutment face.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention to suit individual design requirements and it is intended that such revisions and adaptations will be included within the scope of the following claims as equivalents of the invention.

Having now described my invention, what I claim is:

1. A master cylinder assembly for a hydraulic system comprising a piston and cylinder, said cylinder having a fluid outlet on the forward side thereof, and an inlet for fluid on the other side thereof, said piston being provided with a resilient sealing ring for engagement with said cylinder and axially slidably mounted thereon, two axially spaced radially extending abutments on said piston limiting the slidable movement of said ring, said sealing ring having at least one axially extending channel formed on its inner peripheral surface to provide on the return stroke of the piston a passage for hydraulic fluid between the inlet and the part of the interior of the cylinder forward of the piston, said ring being engageable with a rear abutment face on the piston during the forward stroke of the piston to seal the said passage for hydraulic fluid.

2. A master cylinder assembly according to claim 1 wherein each channel in said sealing ring extends from the forward face thereof to a point forward of the rear face thereof and said piston is provided with a recess to allow communication between said channel and the rear face of said sealing ring.

3. A master cylinder assembly according to claim 1 wherein each channel is radially outwardly flared at its forward end to ensure communication between the channel and the part of the interior of the cylinder forward of the piston when the sealing ring abuts the forward abutment.

4. A master cylinder assembly according to claim 1 wherein a spring is provided to urge the sealing ring towards the rear abutment face.

5. A master cylinder assembly according to claim 1 wherein the diameter of the outer edge of the rear abutment face of the piston, together with the portion of the piston behind the said rear abutment face, is such as to provide an annular space communicating with the inlet.

6. A master cylinder assembly according to claim 1 wherein the sealing ring is recessed on its forward face and is provided with an axially projecting annular lip engaging the inner surface of the cylinder.

7. A master cylinder assembly according to claim 1 wherein the sealing ring is provided with a rigid backing ring of L-shaped cross-section.

8. A sealing ring for use in a master cylinder assembly according to claim 1, the sealing ring having at least one axially-extending channel formed on its inner peripheral surface.

9. A sealing ring according to claim 8 wherein each channel in the sealing ring extends from the forward face thereof to a point forward of the rear face of the ring.

10. A sealing ring according to claim 8 wherein each channel is radially outwardly flared at the forward end.

11. A sealing ring according to claim 8 wherein the sealing ring is recessed on its forward end and is provided with an axially projecting annular lip at its outer periphery.

12. A sealing ring according to claim 8 wherein the sealing ring is provided with a rigid backing ring of L-shaped cross-section.

13. In a master cylinder assembly a piston slidably mounted within a cylinder bore having two spaced fluid access passage means, means defining two spaced abutments on said piston, a sealing member movable between said spaced abutments which are proportioned a distance apart in relation to the spacing of said access openings whereby said seal is adapted to seal one or the other of said passage means, and spring means for biasing said sealing means against one of said abutments to provide free fluid access through one of said passage means into the cylinder bore in the retracted position of said piston.

References Cited by the Examiner
UNITED STATES PATENTS

| | | | |
|---|---|---|---|
| 3,141,303 | 7/1964 | Baldwin | 60—54.6 |
| 3,165,896 | 1/1965 | Baldwin | 60—54.6 |

MARTIN P. SCHWADRON, *Primary Examiner.*

ROBERT R. BUNEVICH, *Examiner.*